(12) United States Patent
Miel et al.

(10) Patent No.: US 12,316,756 B2
(45) Date of Patent: May 27, 2025

(54) CLIENT-BASED ENFORCEMENT FOR MID-SESSION REAUTHENTICATION

(71) Applicant: Cisco Technology, Inc., San Jose, CA (US)

(72) Inventors: Shayne Miel, Durham, NC (US); Brian Lindauer, Austin, TX (US); Glenn J. Stempeck, Livonia, MI (US); David William Matteson, Dexter, MI (US); Ian Edward Beals, Saline, MI (US); Josh Matz, Ann Arbor, MI (US); Edgar Calderon, Fairfax, VA (US); Laura Cole, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 18/156,993

(22) Filed: Jan. 19, 2023

(65) Prior Publication Data

US 2024/0250812 A1    Jul. 25, 2024

(51) Int. Cl.
*H04L 9/08* (2006.01)
*H04L 9/32* (2006.01)

(52) U.S. Cl.
CPC .......... *H04L 9/0863* (2013.01); *H04L 9/3234* (2013.01)

(58) Field of Classification Search
CPC ....... H04L 9/0863; H04L 9/3234; H04L 9/32; H04L 9/08
See application file for complete search history.

(56) References Cited

U.S. PATENT DOCUMENTS

| | | |
|---|---|---|
| 8,925,053 B1 | 12/2014 | Mehta |
| 2004/0098588 A1 | 5/2004 | Ohba et al. |
| 2007/0101418 A1 | 5/2007 | Wood et al. |
| 2014/0164776 A1* | 6/2014 | Hook ............. G06F 21/6218 713/171 |
| 2016/0344561 A1* | 11/2016 | Grajek ............. H04L 63/0884 |
| 2018/0109632 A1 | 4/2018 | Stammers et al. |
| 2018/0241734 A1 | 8/2018 | Bhimanaik |
| 2022/0094531 A1* | 3/2022 | Kozlov ............. H04L 63/0478 |
| 2022/0131844 A1 | 4/2022 | Sherlock et al. |

\* cited by examiner

*Primary Examiner* — Quazi Farooqui
(74) *Attorney, Agent, or Firm* — Polsinelli P.C.

(57) ABSTRACT

The present disclosure provides protection to communications after establishing a secured connection to a secured website or application. An authentication service, after establishing a secured session, can calculate a trust score for a user. Based on the trust score, the security agent can encrypt access tokens used to authenticate a secure connection. The system can interrupt the secure connection based on the trust score of the user or the user device. The interruption takes place by ignoring requests to decrypt the access token. Without the decrypted access token, the browser is unable to authenticate the session, preventing further communications. After the user improves the security posture of the device or user, the security agent can recalculate the trust score. When the trust score is above a threshold, the security agent can being decrypting the access token, thereby authenticating communications from the browser.

20 Claims, 6 Drawing Sheets

CLIENT-BASED ENFORCEMENT FOR MID-SESSION REAUTHENTICATION

TECHNICAL FIELD

The present disclosure relates to mid-session reauthentication. Aspects of the disclosure involve encrypting access tokens via a browser, and controlling access to secure communications by controlling access to the decryption process.

BACKGROUND

Communications between users and secured websites often rely on two-factor authentication (2FA) to secure the communication channels between the user device and the secured site. Traditionally, as the user accesses a secure website, the secure website is able to accept a user login. This process works to assess the authenticity of the user at the beginning of a secure session, and the system does not assess the ongoing security or authenticity of the user or user device during the secure session. The secure system would not inquire about the security or authenticity of the user or user device until the next secure connection is initiated.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Certain aspects of this disclosure are provided below. Some of these aspects may be applied independently, and some of them may be applied in combination, as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Overview

The present technology provides on-device protection to communications after establishing a secured connection to a secured website or application. After establishing a secured session based on the trust score of the user, an authentication service can use the tokens that authenticate and protect the secure connection from changes in the trustworthiness of a user device and/or user during the secure session. The authentication service can receive a communication from a security agent program on the user device that identifies a change in the security posture of the device or user. Based on this change, the system can undertake an analysis of the trust level of the user device or the user and determine if the trust level is above or below a threshold of trustworthiness. If the trust level remains above the required threshold of trustworthiness, then the secured connection can continue. If the trust level falls below a required threshold, the system will respond by leaving an access token encrypted, preventing the secure session from continuing.

The security agent in the browser of the user device can intercept the access token used by the secure session to confirm access permissions of the user and/or user device. The security agent can then encrypt the access token so that the access token can only be used when the security agent decrypts the encrypted access token. The access token is typically passed from the browser to storage, where it can be retrieved prior to further communications with the secured site. The security agent encrypts the access token and then provides it to the browser, where the browser continues with the process of storing the now encrypted access token. The security agent is able to respond to signals from the authentication service or the security agent itself that determines a change in the security posture of the user and/or user device and then determine whether or not to decrypt the encrypted access token based on a continuous updating of the trust score of the user and/or user device. During communications with the secure site that require the access token to confirm authenticity, the security agent will first take the encrypted access token from the browser, decrypt it, and then provide it to the browser to continue communications.

If the user remediates the security concerns, then the authentication service and/or the security agent is able to update the security posture encountered by the device. As the trust score of the access device and/or user increases and improves above the threshold, the authentication system and security agent can determine that that system is now secure, and the security agent can begin decrypting the access token, thereby allowing the secure communications to continue.

The authentication service is a multi-factor authentication service, and the particular authentication technique is a multi-factor authentication technique.

The present technology further includes presenting a user interface for a primary authentication technique to authenticate the first user account with the first resource, and after successful completion of the primary authentication technique, sending the authentication request to the authentication service, where the contextual information associated with the first access device includes one or more of data identifying a network from which the access device is connected, the IP address of the access device, a browser version used to access the first resource, an identification of browser extensions installed in the browser used to access the first resource, an operating system on the access device, and a type of access device. The authentication service can determine, based on the contextual information and the information identifying the first resource, that the particular authentication technique is permitted by a policy associated with the first resource.

The present technology further includes continuously polling the security agent to determine if any of the contextual information changes or if any security information changes that would alter the trust level of the user device or the user. Further information that can be included in the calculation of trust level includes timer periods between authenticated communications, locations, security compromises, unsafe networks, and information received from the secured site, amongst other data. This data is collected while the secure connection is operating, and the security agent at the client device or on the network is able to pause or otherwise control the connection to prevent potentially unauthorized communication during the secured session. Other technical features may be readily apparent to one skilled in the art from the following figures, descriptions, and claims.

DETAILED DESCRIPTION OF EXAMPLE EMBODIMENTS

Disclosed herein are systems and methods for using a browser-based security agent in a secured communications system, where the system is able to continuously monitor and calculate a trust score for the user and/or user device. When the user and/or user device is deemed untrustworthy, the browser-based security agent ignores requests to decrypt the encrypted access token, thereby preventing communications from being authenticated and used in the secured communications system. Once the user improves the security posture of the user device, the system can update the trust score, and when the trust score is above a threshold, the security agent can begin accepting requests to decrypt the access token and provide the decrypted access token to the browser. The browser includes the decrypted access token to resume and authenticate the secured communications.

The system establishes a secure environment using multi-factor authentication; when a user performs second-factor authentication through a service, such as DUO or OKTA, they are often presented with a number of possible factors that they can use to authenticate their identity. These factors may include hash-based one-time password (HOTP) codes, phone calls, a push to a mobile application, web-based authentication (e.g., WebAuthN), etc. For example, a push to a mobile application, such as a push to Duo Mobile, typically includes the following steps: (1) a server receives a pre-authorization request (e.g., a user entered a password correctly, and now the server is being requested to send an MFA push); (2) the server cross-checks information to make a determination on whether the characteristics associated with the user comply with a policy (e.g., a company user policy) which allows the user to access the requested service. Such cross-checked information may include information associated with the user's IP address, whether or not the user is on a permitted network (e.g., their home private network), browser information (e.g., browser version, what extensions are installed, etc.), the operating system (OS) type, type of computer, a unique ID of an application being accessed, the company, time of day), etc. Based on these types of information, the server decides whether the user is compliant with the policy, and then; (3) the server provides the MFA push to the user, for example, by sending to a known device registered with the user, a request for the user to acknowledge the sign-in request. This acknowledgment may be in the form of two confirmation buttons, one approving the request and one disapproving the request. It should be noted that the type of MFA provided to the user may be user selected or may be based on the policy associated with the company, service, user, other methods, or any combination thereof. If the user selects the "approve" button, the device originally seeking the connection permission is allowed to connect to the respective service.

After the initial connection is established, the system, user, and/or user device can encounter situations that increase the amount of risk associated with the device connected to a secure environment. The system can collect information from multiple sources, which allows the authentication service to determine if the increased risks have altered the user or client device's security posture enough to require further mitigation steps prior to continuing the secured session. Based on the information collected, the system can continuously update the trust assessment and determine if the session needs to be interrupted and, if so, what mitigation measures are needed to bring the secure session back into compliance with the risk management levels appropriate for a secure connection.

The system can collect different types of information, all of which can be weighed to determine if the access device has a risk score that is appropriate for the secure connection. For example, the system can assess events that are taking place at the device accessing the secure connection. Events that can be assessed include the time intervals between trusted signals. If the secure connection has no communications with the access device for an extended period of time, that could indicate that the connection is stale, and a reauthentication and/or reauthorization of the secure connection is warranted. Further risk events at the device can include malware detected at the user device or the system recognizing that the use and/or the number of downloads is abnormally large. The security agent on the phone can also detect unusual patterns of behavior on the phone, which can indicate that risk events are taking place. These are all possible indications that the risk profile of the user device has increased, reducing the trust factor associated with the device, and requiring actions by the user to mitigate some risk factors before continuing with the secure connection.

The system also can receive information from the authentication service that indicates risk events have occurred. For example, the authentication service can keep track of recent password hacks and determine that a password associated with the user account has been compromised. Further, the authentication service can determine that the user account is attempting to sign on from a different location than a currently active secure session, which would indicate the user account is compromised. It is also possible for the system to determine that multiple IP addresses are being used to attempt to access a secure site. The authentication service can also determine that there is a risk of data loss from the access device and determine that a reduction of the risk score is needed. When any of these factors are found within the system, the system can determine that additional security measures are required.

The system, either the security agent on the access device or the authentication service, can also detect that an account is being attacked via risk vectors associated with multi-factor authentication. The system could recognize any of the push attacks that are fairly common; for example, push spray, push harassment, adversary-in-the-middle, and passcode phishing attacks are common types of attacks, all of which are made more susceptible by "push fatigue." This may occur because the user is distracted or overwhelmed by constant notifications, and it may be misinterpreted as a bug or confused with other legitimate authentication requests. Repeated multi-factor authentication requests result in users paying less attention to the details of their login, causing a user to mindlessly accept a push login or pay less attention to the site they are logging into, which may be fraudulent but look very similar to the legitimate site. These attacks are all particularly effective—not because of the technology involved, but because they target the human factor via social engineering. By recognizing these threat vectors, the system can determine that the risk profile of the account is increased and the need for reauthentication is necessary.

Figure 1:
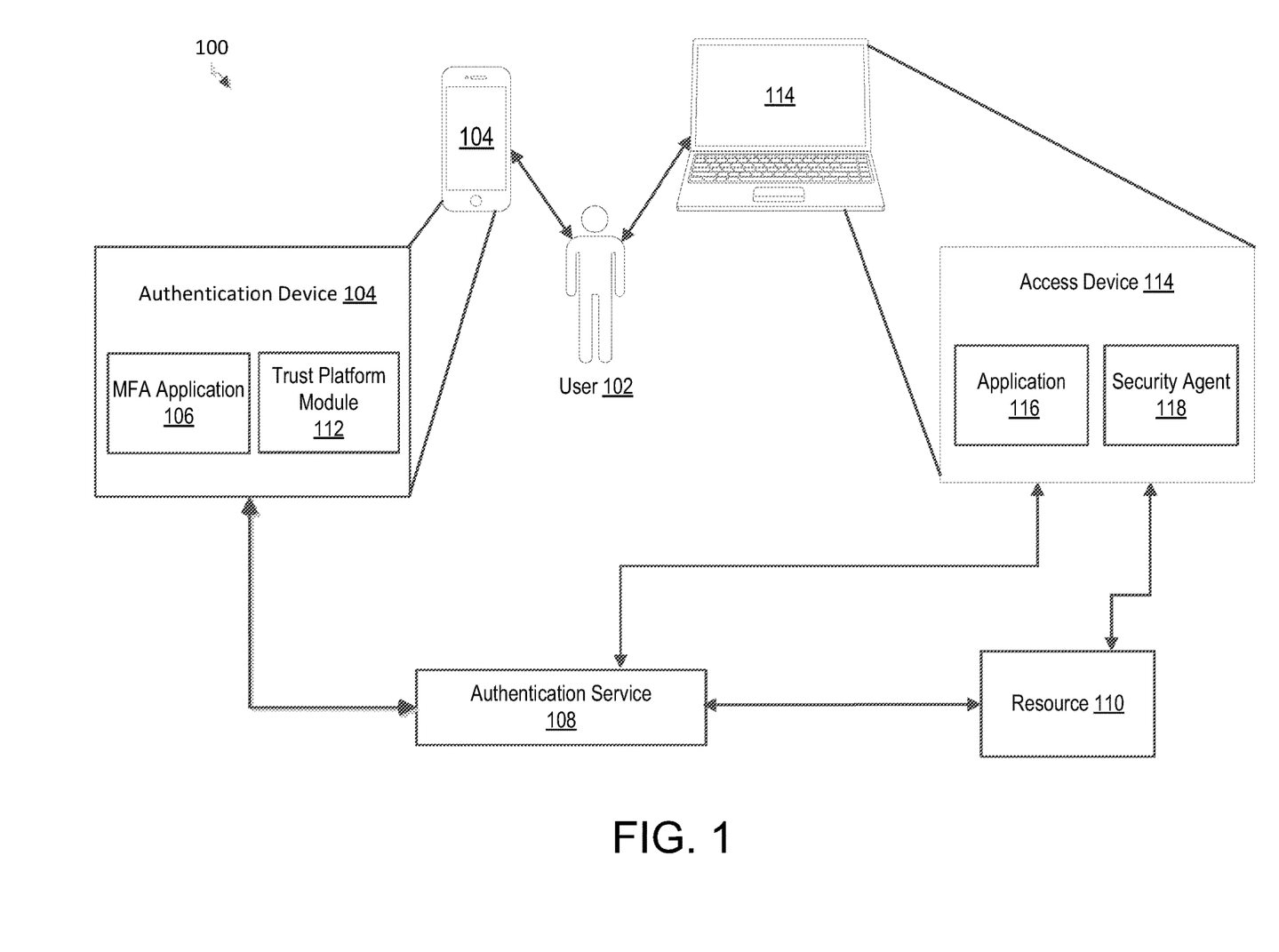
FIG. 1 illustrates an exam mid-session reauthentication system in accordance with some aspects of the present technology.

FIG. 1 illustrates an example environment for using a browser-based security agent to continuously monitor secured communications between a user device and a secured site in accordance with some aspects of the present technology. User 102 can gain authorized access to resource 110 by using authentication device 104. User 102 can be any user, including an employee, contractor, client, member of an organization, private individual, etc., attempting to access a service. The authentication device 104 can be hardware, software-only, or combinations thereof. The authentication device 104 can be a mobile device or a personal computer.

Resource 110 can be any service, resource, device, or entity which requires authentication of user 102. For example, resource 110 can be a social media service, bank, hospital, motor vehicle department, bar, voting system, Internet of Things (IoT) device, or access device. In some embodiments, resource 110 can be accessed by user 102 through an access device 114, such as a mobile phone or personal computer. In some embodiments, resource 110 can be accessed by user 102 through an application 116 on an access device 114 that is specifically designed for accessing resource 110 or through a more general application 116 that can access multiple services, such as a web browser or portions of an operating system. In some embodiments, resource 110 can be a plurality of resources, such as a network or enterprise system.

Resource 110 can authenticate the identity of user 102 on its own through the use of an authentication mechanism and can utilize the authentication service 108 to provide an additional factor of authentication. For example, user 102 can attempt to access the resource 110 using the access device 114. In some embodiments, the access device 114 can also be the authentication device 104, such as when user 102 attempts to access the resource 110 using an app or browser on authentication device 104. The resource 110 can perform a first authentication mechanism by interacting with the access device 114. Thereafter, the resource 110 can request an additional authentication using authentication device 104.

In some embodiments, the additional authentication can include requesting a code generated by the authentication device 104. For example, the MFA application 106 might generate a pseudo-random number using a mechanism agreed upon with resource 110. The user 102 can operate the authentication device 104 to cause the MFA application 106 to generate the pseudo-random number, which the user 102 can then enter into the access device 114 to achieve the additional authentication. In some embodiments, if the authentication device 104 is equipped with a trust platform module 112, the MFA application 106 can utilize the trust platform module 112 to generate the pseudo-random number.

In some embodiments, the additional authentication can include requesting a code or authorization generated by the authentication device 104 by making the request through the authentication service 108. For example, the resource 110 can pass information identifying the user 102 to the authentication service 108 with a request for additional authentication. The authentication service 108 can send a request (typically a push request) for authentication to the authentication device 104, which is known to be a device associated with the user 102. The user can respond to the request for authentication on the authentication device 104 by interacting with the MFA application 106 to perform the required actions. When the required actions are properly performed, the MFA application 106 can send a communication informing the authentication service 108 of the successful authentication, and the authentication service 108 can inform the resource 110 of the successful authentication.

In some embodiments, the additional authentication can include requesting a code generated at resource 110 to be entered at the authentication device 104 by making the request through the authentication service 108. For example, the resource 110 can pass information identifying the user 102 to the authentication service 108 with a request for additional authentication. The authentication service 108 can send a request (typically a push request) for authentication to the authentication device 104, which is known to be a device associated with the user 102. In this example, the MFA application 106 presents a user interface requesting that the user 102 enter a code that is presented on the access device 114 that originated from the resource 110. The user can respond to the request for authentication on the authentication device 104 by interacting with the MFA application 106 to perform the required action by entering the code. When the code is properly entered, the MFA application 106 can send a communication informing the authentication service 108 of the code, and the authentication service 108 can pass the code to the resource 110, where the resource 110 will consider the additional authentication successful when the received code matches the code sent to the access device 114.

In some embodiments, the authentication device 104 and/or the access device 114 can also report context data to the authentication service 108. As addressed above, the authentication device 104 can include the MFA application 106 that can communicate with the authentication service 108. The access device 114 can include a security agent 118 that can also communicate with the authentication service 108. The MFA application 106 and the security agent 118 can gather and send information to the authentication service 108. For example, the information can include biometric, behavioral, and contextual data from user 102. These biometrics can include, for example, fingerprints, facial detection, retinal scans, voice identification, or gait data, among other biometrics. The context data can include the time since the user last interacted with the device, changes to the network connection experienced by the device, information about the integrity of the operating system of the device, information about what operating system and what version of the operating system the device is running, among other examples. This information can be used by the authentication service 108 to determine if the device should be trusted to be used as part of the authentication process or trusted to access the resource 110. In some instances, the information can indicate that something has changed about the user 102, the authentication device 104, or the access device 114 during an authenticated session with resource 110 can take certain actions depending on a configured policy to access the resource 110.

The security agent 118 can be, for example, a plug-in in a browser that is capable of receiving and analyzing communications from the browser. In one example, access device 114 runs applications 116, including a browser. The browser application can have various plug-ins installed, including a plug-in associated with authentication service 108, which acts as security agent 118. The security agent 118 is in communication with the browser and authentication service 108. The security agent 118 can receive contextual data and operating instructions from authentication service 108, from application 116, and/or determine the contextual data and operating instructions itself. In a specific example, the browser will recognize blocks of data that are significant, e.g., change security posture, from specific website, etc., for the security agent 118, and will identify those blocks for the plug-in to investigate. However, the plug-in can also review all blocks received by the browser to determine which are significant. The data that are significant can be communicated by the plug-in to the authentication service, where a trust score is calculated. The authentication service 108 can then provide operating instructions to the security agent 118, including instructions on how to handle changes in security posture of the access device.

There are multiple ways to implement the security agent 118 on the access device 114. In one further example, the authentication service 108 can provide the user a link that provides the appropriate settings and software to the access device 114. To continue this example, the authentication service 108 can provide a link to the access device 114. The link can include instructions on how to set up a profile with the browser, plugin, or authentications service. One possible example is the use of Google profiles, which can include the security agent 118 as a plugin at a Chrome browser as part of the profile. The authentication service can then require the profile to be signed in and the browser plugin, e.g., security agent 118, operating for the secure connection to continue. So, while the plugin has access to the internet and can communicate with authentication service 108, the browser is able to communicate with resource 110.

The security agent can encrypt data after receiving instructions from the authentication service or after determining that a secure connection to resource 110 has been established. The security agent can listen for access tokens associated with the resource 110 or the browser can identify for the security agent 118 when the browser encounters an access token. The security agent can provide on the fly encryption for the access tokens, that encrypts the access token prior to storage by the browser. Similarly, when the browser needs to use the access token for communications, the security agent is able to recognize the encrypted token, decrypt it, and provide it to the browser to authenticate communications.

While one example involves receiving inputs from the authentication service 108 of changes to the security posture of the access device or user account, the security agent can also accept inputs from other sources. For example, there can be user inputs, resource 110, security applications running on the access device or the network, device or network monitoring software including AI based applications, can all individually or collectively provide data related a change in the security posture of the user, user account, or the access device.

Figure 2:
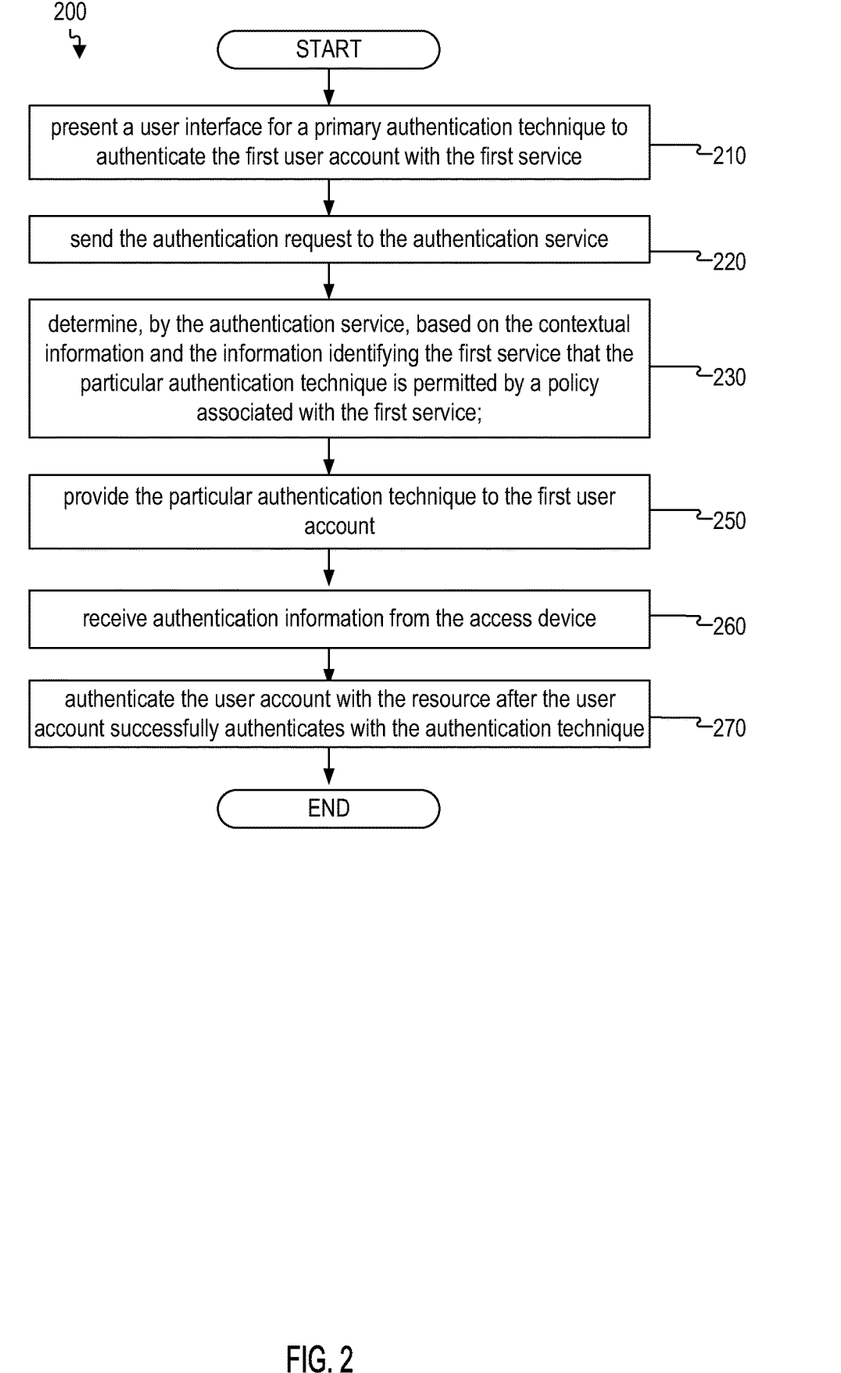
FIG. 2 illustrates an example method in accordance with some aspects of the present technology.

FIG. 2 illustrates an example method 200 for establishing a secure connection between an access device and a secure service. The method includes various aspects of the disclosure as they relate to authenticating the access device, continuously monitoring the trustworthiness of the access device during the secure communications and interrupting the communications if the security posture of the access device is decreased below an acceptable level. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes presenting a user interface for a primary authentication technique to authenticate the first user account with the resource at block 210. For example, the access device 114, illustrated in FIG. 1, may present a user interface for a primary authentication technique to authenticate the first user account with the resource (i.e., resource 110), such as through an application installed on the user's 102 laptop (i.e., access device 114). As previously discussed, access device 114 may include hardware (e.g., a computer), software (e.g., a browser extension), a website (e.g., a web portal) hosted on a separate computing device, or any other application of the device capable of presenting the interface for a primary authentication technique. In some examples, the primary authentication technique is a username and password. In some examples, the primary authentication technique may be any authentication technique capable of verifying the user's 102 information. It should be noted that presenting a user interface for a primary authentication technique may have been initiated by a bad actor as part of an initial step in gaining access to a resource 110. In some examples, a legitimate user 102 may have requested the primary authentication technique while a bad actor is inconspicuously monitoring the legitimate user, such as in an adversary-in-the-middle attack. In this regard, the primary authentication technique may be presented based on a legitimate request, an illegitimate request, or simultaneous legitimate and illegitimate requests.

According to some examples, the method includes sending the authentication request to the authentication service at block 220. For example, the resource 110 may send the authentication request to the authentication service 108. In some examples, the authentication service is a multi-factor authentication service. In some examples, the authentication service is a two-factor authentication service. In this regard, the authentication service may require one or more factors to authenticate the user in various possible examples. In some examples, the authentication request includes contextual information associated with the access device 114 of the request and information identifying the resource 110. The authentication request may include contextual information associated with the request and/or the user 102, including the IP address of the access device, a browser version, identification of browser extensions, an operating system on the access device, a type of access device, time of day, geographical information, combinations of the same, etc., in various possible examples. In some examples, the contextual information associated with the access device 114, authentication device 104, and/or user 102 includes one or more data identifying a network from which the access device or authentication device is connected. In some examples, the request or contextual information includes information about the user, such as a name or username, password, user ID, combinations of the same, etc., in various possible examples.

According to some examples, the method 200 includes determining, by the authentication service and/or authentication device, based on the contextual information and the information identifying the first service, that the particular authentication technique is permitted by a policy associated with the first service at block 230. For example, the authentication service 108 illustrated in FIG. 1 may determine, based on the contextual information and the information identifying the resource 110, that the particular authentication technique is permitted by a policy associated with the resource 110. In some examples, the authentication service 108 may set the policy associated with the resource 110. In some examples, the policy may be set by the resource 110. In some examples, the policy may be set by an administrator or user of the resource 110. It should be noted that the policy associated with the particular authentication technique may be updated, adjusted, changed, or otherwise set for each user 102 or user account, groups of users or accounts, resource 110, particular authentication technique, authentication device 104, authentication session, combinations of the same, etc., in various possible examples.

Further, the method 200 may determine that the contextual information, such as from the access device, is only allowed to utilize a subset of available authentication techniques (e.g., two of five available authentication techniques) associated with the resource, authentication service, and/or policy. For example, the contextual information may include information that the user 102 is on a public network (e.g., accessing the internet on a laptop in a coffee shop), and the authentication service 108 may determine (e.g., based on the policy and the contextual information) that the user 102 may only utilize a push type authentication method, biometric authentication method, or similar. In this regard, the authentication service 108 and/or authentication device 104 may consider contextual information associated with the request and/or the user 102 to indicate a higher risk associated with allowing the user to use particular authentication techniques.

According to some examples, the method includes providing the particular authentication technique to the first user account at block 250. For example, the authentication device 104 may provide the particular authentication technique to the first user account via a website or web portal, application, email, pop-up extension, notification (e.g., email), computing device, hardware device (e.g., a fingerprint reader), combinations of the same, etc., in various possible examples. In some examples, the authentication service 108 or the resource 110 may provide the particular authentication technique to the user via the authentication device 104 or the access device 114.

In some examples, the user 102 may be offered options for at least two authentication techniques. For example, authentication service 108 or authentication device 104 may offer the user the option to select between a "push" (e.g., a pop-up on the user's mobile device or access device) or a one-time passcode (OTP) (e.g., sent via email to the user account associated with the access request). In some examples, the options associated with the available authentication techniques may be based on the policy associated with the resource 110 or authentication service 108. In some examples, the options associated with the available authentication techniques may be based on the user account, type of device requesting the access, contextual information associated with the request, data including previous requests or other historical information, a current network or threat level assessment, combinations of the same, etc., in various possible examples. In some examples, the user associated with the user account selects the particular authentication technique.

According to some examples, the method includes receiving authentication information from the access device at block 260. In some examples, the authentication service 108, authentication device 104, and/or resource 110 may require authenticating with MFA after the user 102 provides the primary authentication to mitigate the risk associated with security events and allow the user 102 to utilize resource 110. In this regard, one example includes receiving an access code from the authentication device for authentication verification at the authentication service 108, authentication device 104, and/or resource 110. Although not shown, method 200 may repeat any step, combine steps, skip steps, iterate steps, combinations of the same, etc., in various possible examples.

According to some examples, the method includes authenticating the user account with the resource 110 after the user account successfully authenticates with the authentication technique at block 270. In this regard, once the system determines that the user account is authenticated (e.g., by a successful user MFA authentication), the system can proceed with the default configuration. In some examples, a rule or policy associated with the authentication service 108, authentication device 104, and/or resource 110 may determine during the authenticated session when further authentication is needed based on new information received by the system.

Figure 3A:
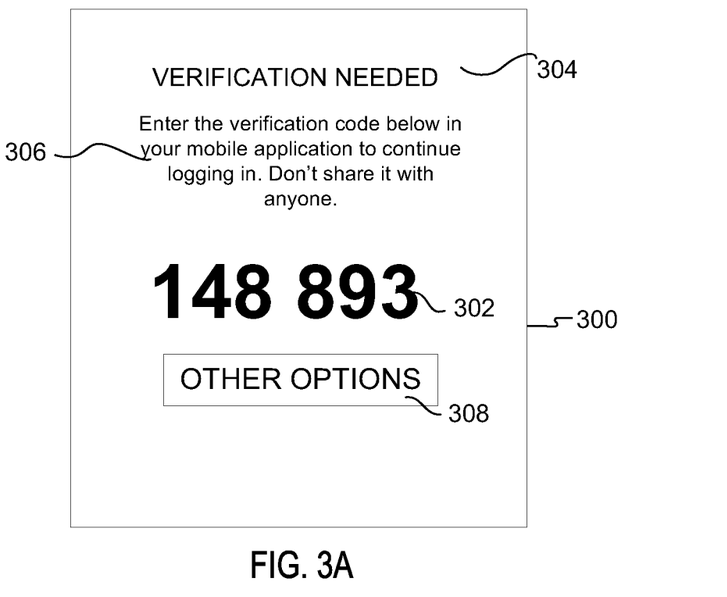
FIGS. 3A and 3B show an example of a particular authentication technique, including a push in accordance with some aspects of the present technology.
Figure 3B:
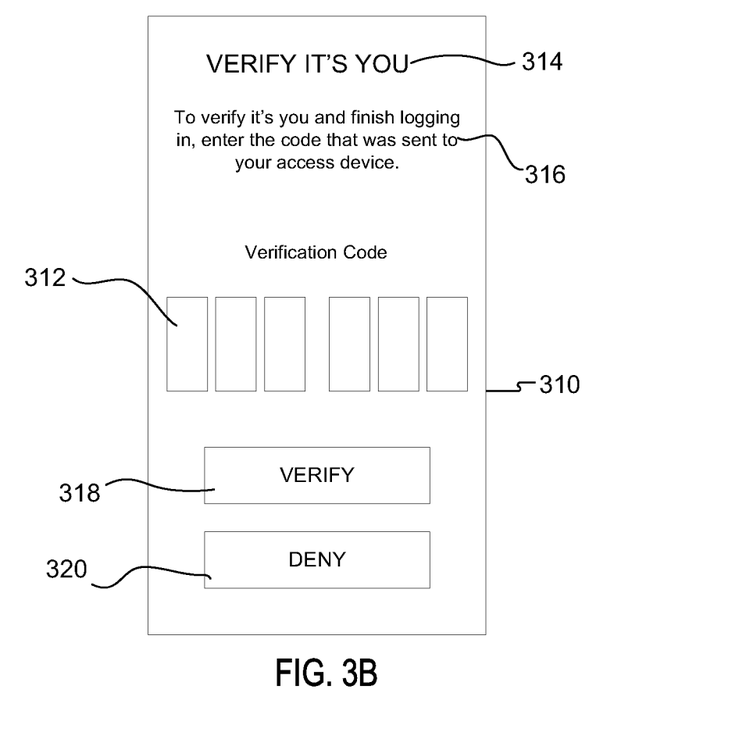

FIGS. 3A-B show an example of a particular authentication technique, including a mobile push, which may be an alternative authentication technique. It should be noted that the mobile push may be a primary authentication technique or an alternative authentication technique. Mobile push is a higher friction version of a mobile push, in which the user may be asked to enter a code on an authentication device 104 or another authentication device, such as a mobile device, in order to approve the push. As shown in FIG. 3A, the user 102 may be presented with a code 302, such as a six-digit code. It should be noted that the code 302 may be any suitable length, including numbers, letters, symbols, or pictures, and combinations thereof in various possible examples. The code 302 may be shown in a prompt 300, and the prompt may be presented on the user's 102 access device 114, such as a laptop when the push is initiated (or shortly thereafter). In this regard, the user 102 may not approve the push unless they are actually the one who triggered it, i.e., the code is on the device that triggered the request. Shown in FIG. 3A, the prompt may include a header 304 indicating what is needed, such as additional verification. Message 306 may be shown to aid the user 102 in completing the authentication verification, such as with instructions on how to complete the authentication. In some examples, the user 102 may be presented with an alternative options button 308, which may include alternate authentication techniques available to the user 102. It should be noted that the alternate techniques available to the user 102 through the alternative options button 308 may be determined by the authentication service 108, a rule or policy associated with the resource 110, user 102, a group of users, combinations of the same, etc., in various possible examples. The length of the code may be configurable. For example, more digits may provide a stronger security guarantee because an attacker only has a 1-in-1,000,000 chance of guessing a 6-digit code correctly versus a 1-in-102 chance with a shorter code, such as a 2-digit code. It should be noted that a mobile push may be triggered adaptively, such as when the user 102 appears to be involved in a push fraud attack.

FIG. 3B shows an example verification interface 310 for inputting the code 302 that may be presented to the user's 102 authentication device 104, such as a mobile device. The verification interface 310 may include a header 314 indicating to the user 102 what the purpose of the interface may be, such as Verify It's You. The verification interface 310 may include a message 316 that aids the user 102 in completing verification. The code 302 may be entered into the code verification boxes 312. In some examples, the user 102 may then choose to verify the code by pressing a verify button 318. In some examples, the user 102 may not need to press a verify button 318, and the code 302 may automatically be authenticated when entered. In some examples, the user 102 may choose to deny the authentication by pressing a deny button 320.

Figure 4:
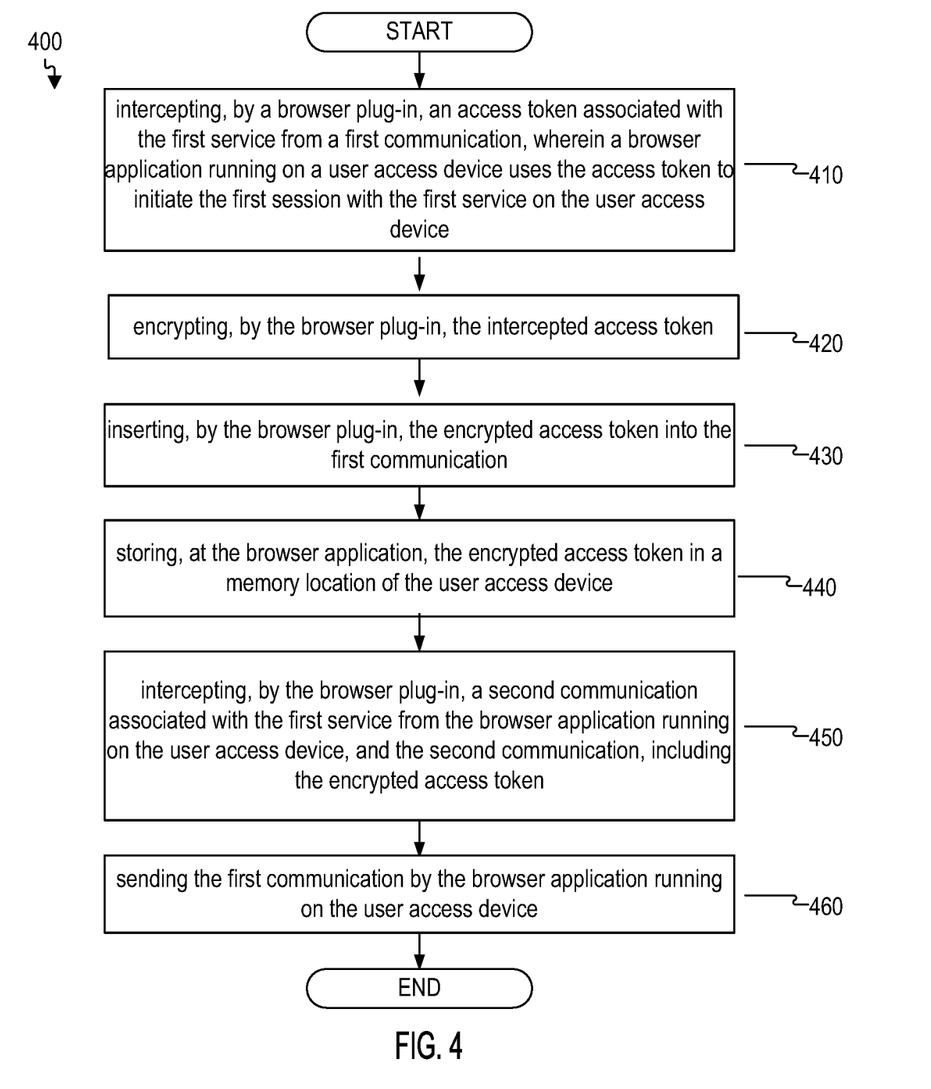
FIG. 4 illustrates an example method of encrypting an access token during a secure communication session, in accordance with some aspects of the present technology.

FIG. 4 shows an example method 400 of a particular technique for identifying mid-session that reauthorization is needed to continue the session. According to some examples, the method includes determining, based on data received during the session, that the user or user device has encountered an issue that jeopardizes the security of the session. In some examples, when the system detects that the security has been compromised, the authentication system is able to pause the session until the session has been reauthenticated.

According to some examples, the method 400 includes intercepting, by a browser plug-in, an access token associated with the first service from a first communication, wherein a browser application running on a user access device uses the access token to initiate the first session with the first service on the user access device at step 410. For example, access device 114 can be a browser running a plug-in that authenticates that the user is a trusted individual on the system. The plug-in running on the browser can be security agent 118, which has access to the authentication service 108 through resource 110. One method of securing the browser that is consistent with the present disclosure is for the browser at access device 114 to install plug-ins associated with the authentication service 108. When access device 114 accesses resource 110 that needs authentication, the resource 110 and the authentication service 108 can work together to authenticate the user accessing the website as a trusted user of the program.

The verification steps for the website requiring a secure session include signing into the secure session at the website and then using two-factor authentication through the browser plug-in to establish the secure session. Establishing the secure session can include, for example, creating an access token that is passed from the website to the browser, where it is stored on the access device 114. The browser is then able to interact with the website and use the access token to authenticate the identity of the user or user device.

A primary authentication technique to authenticate the first user account and/or access device with the resource 110 includes sending the authentication request to the authentication service that includes contextual information. For example, the contextual information associated with the access device 114 includes one or more of data identifying a network from which the access device is connected, the IP address of the access device, a browser version used to access the first resource, an identification of browser extensions installed in the browser used to access the resource 110, an operating system on the access device, a type of access device, etc. The authentication service can determine, based on the contextual information provided and information identifying the resource 110, that the user account and/or access device are authorized to communicate with resource 110.

With access to the access token from the secured service, a browser plug-in, e.g., security agent 118, can intercept the access token after it is received by the browser. Typically, in a normal process for the browser, e.g., application 116, the token is received and stored at the access device 114 of FIG. 1. However, in accordance with the present disclosure, the plug-in is able to stand between the browser and the storage, and provide additional security to the system by, for example, encrypting the access token prior to storing it at the access device 114. After the plug-in encrypts the access token, the browser would then continue the process of storing the access token at the access device 114, according to its normal process. However, by providing security agent 118 access to the access token prior to storage, additional security can be added to the system during the operation of the session because the security agent now controls the browser's ability to communicate with resource 110 through encrypting the access token.

According to some examples, the method 400 includes encrypting, by the browser plug-in, the intercepted access token at step 420. For example, as described with respect to step 410, the browser plug-in can stand between the browser, e.g., application 116, and storing an access token at the access device 114 of FIG. 1. By accessing the communications between application 116, and the resource 110 requiring a secure session, the browser plug-in, e.g., security agent 118, is able to determine that the browser has received the access token establishing a secure connection between resource 110 and access device 114. The plug-in can store a list of websites using access tokens to verify the secure communications sessions. For example, if websites only use cookies or tokens for identifying the user for quick sign-in or advertising purposes, then the website may support cookies but not require secure sessions, and therefore traffic for these sites can be ignored by the plug-in. However, a website that is a portal into a secure system can utilize higher levels of security that can support a more sophisticated process for securing the portal. For example, the communications can include access tokens to verify the establishment of a secure session. The access token is received by the browser to validate a secure session, at which point the browser plug-in, e.g., security agent 118, can intercept and encrypt the access token.

The encryption process can take place via any known method of encryption available to the security agent 118. For example, the browser-based encryption process can include different encryption algorithms, for example, symmetric or asymmetric encryption algorithms. The security agent can also include different types of encryption, for example, RSA, AES, ECC, or similar types of encryption. When these encryption processes are implemented, the additional security provided to the secure connection can be realized.

According to some examples, the method 400 includes inserting, by the browser plug-in, the encrypted access token into the first communication at step 430. After the establishment of the secure session and the plug-in has encrypted the access token received by the browser, the browser proceeds to operate the secure session with the secure website. Part of this process is adding the access token back into the data received from the secure website that provided the access token, as the access token needs to be stored by the browser to properly authenticate and access the secure website. One method of operating a secure website involves sending the access token with each communication in the secure session, thereby authenticating that the communication is legitimate. One way to implement this process is for the access token to be stored with the browser to facilitate the communications.

According to some examples, the method 400 includes storing, at the browser application, the encrypted access token in a memory location of the user access device at step 440. For example, the browser application, e.g., application 116 of FIG. 1, can be associated with storage at the access device 114. This storage at access device 114 can store cookies or tokens used by the browser to facilitate access to secure websites as well as other cookies or tokens. The current disclosure utilizes this storage associated with the browser and stores the encrypted access token at the access device 114, where it is accessible to the browser. By being made accessible to the browser, the browser can authenticate communications between the access device 114 and the resource 110.

According to some examples, the method 400 includes intercepting, by the browser plug-in, a second communication associated with the first service from the browser application running on the user access device, and the second communication, including the encrypted access token at step 450. For example, when the browser application, e.g., application 116 of FIG. 1, begins the process of communicating with the secure website, the first step is to authenticate the communication via the use of the access token. During this process, the browser will request the encrypted access token from storage on access device 114 and begin the usual process of sending the cookie with the communication to authenticate the secure session taking place on the browser. The browser does not know that the access token has been encrypted, and if the plug-in fails to decrypt the access token, the encrypted access token will be indecipherable by the resource 110, causing the browser to fail authentication and pausing or ending the secure session. However, when the plug-in is properly authenticated and secure, it will intercept the encrypted access token prior to sending it to resource 110 to decrypt the encrypted access token, allowing the browser to authenticate the secure session and continue communications with the secure service.

According to some examples, the method 400 includes decrypting, by the browser plug-in, the encrypted access token based on access permissions associated with the first service, wherein the decrypted access token is inserted back into the second communication before being sent by the browser application to the first service at step 460. For example, the plug-in, e.g., security agent 118 of FIG. 1, can listen to the communications by the browser, e.g., application 116, and determine they the communications are for resource 110 and the encrypted access token is required to authenticate the communications. The plug-in can then intercept the encrypted token when it is retrieved from storage, and prior to it being communicated to the resource 110, the plug-in can begin the decryption process. After the plug-in has finished the decryption process, the plug-in provides the decrypted access token back to the browser. The browser will then be able to communicate the access token to the secure service, authenticating the secure session and allowing the browser continued access to the secured service.

According to some examples, the method 400 includes sending the first communication by the browser application running on the user access device at step 460. For example, the browser, e.g., application 116 in FIG. 1, will receive the decrypted token from the plug-in, e.g., security agent 118, after the plug-in has decrypted the access token. The decrypted access token provided to the browser is treated by the browser as a normal cookie or token within its standard workflow. The browser will include the access token in the first communication and thereby authenticate the communication with resource 110. This process allows the authentication service, working with the plug-in, to control access to secured sites without disrupting the normal operation of the browser.

The process described in FIG. 4 relates to how the system can operate to provide additional security to a secure session between a browser and a secure service. The additional security can also prevent the browser from continuing to communicate with the secure service by not interacting with the encrypted access token. This process is described in further detail in FIG. 5.

Figure 5:
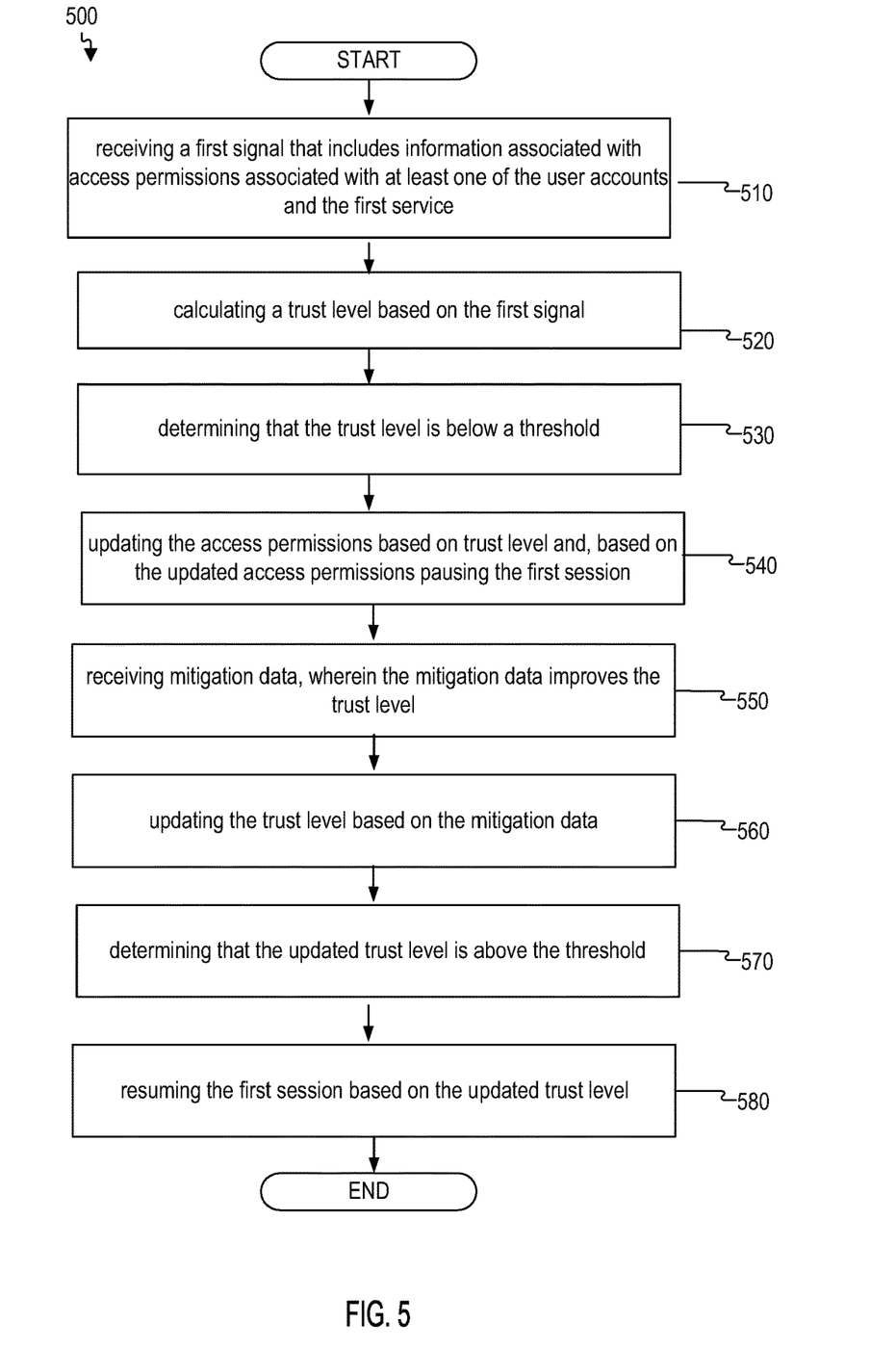
FIG. 5 illustrates an example method for interrupting a secure session based on the trust score of an access device in accordance with some aspects of the present technology.

FIG. 5 shows an example method 500 of a particular technique for identifying mid-session that reauthentication of the session is needed. According to some examples, the method includes determining, based on data received during the session, that the user or user device has encountered an event that changes the security posture of the session. In some examples, when the system suspects that the security of the user account or the access device has been compromised, the authentication system is able to pause the session until the session has been reauthenticated.

According to some examples, the method 500 includes receiving a first signal that includes information associated with access permissions associated with at least one of the user accounts and the first service at step 510. For example, the authentication service 108 of FIG. 1 can communicate information to the plug-in, e.g., security agent 118, that the authentication service 108 has detected circumstances that raise security concerns about the access device 114. For example, the authentication service 108 can determine that the access device 114 is in a geographically compromised location, that a window of time has passed, that the authentication device 104 is not in proximity with the access device 114, that access device 114 has been infected with a virus or malware, amongst other possible security-related situations. Once the information is available to the security agent 118, it can take the information and calculate a level of trust associated with the access device 114. It is also possible for the authentication service 108 to take the information and calculate the level of trust associated with the access device 114 and then provide that trust level data to the security agent 118.

According to some examples, the method 500 includes calculating a trust level based on the first signal at step 520. For example, the security agent 118 of FIG. 1 can collect contextual information and/or receive a signal from the authentication service regarding both the positive and negative contextual information associated with the access device 114 or the environment and location of access device 114. Based on this contextual information collected and/or received, the security agent 118 can calculate a trust level for the access device 114. One example is that if the user were to disable a firewall on the access device 114, this contextual information could be used in the calculation of the trust level associated with access device 114. When negative contextual information is collected and included in the trust score calculation, the results are a lower trust score. Similarly, if the authentication service 108 sends information related to an event, e.g., the user's password was hacked, this information can be included in the trust score calculation, and the trust score would decrease. The security agent 118 can then determine how to respond to the newly calculated trust score, including potentially interrupting the secure connection or changing the quality of service for the secure connection.

Administrators implementing either the authentication service 108 or the secure resource 110 can provide heuristics for calculating the trust score and the system's response to that trust score. The security agent 118 and/or authentication service 108 can also determine what actions or information the user needs to implement to raise the trust score. The heuristics used by the security agent and/or authentication service can also determine if the user needs to reauthenticate the session or if the trust score, while impacted negatively by the events, is still above a threshold that allows the secured session to continue. So, in this example, the administrator can implement a check for the firewall, and when the system determines that the firewall is disabled, that information is provided to authentication service 108 and/or security agent 118 to calculate a trust level that determines the access privileges for the client device. If the firewall is required for continued access, the security agent can pause decrypting the access token, preventing the secure connection from continuing until the firewall is enabled. In the password example, once the user creates a new, non-compromised password, the security agent 118 can resume decrypting the access token. Each event and the contextual information identified can increase or decrease the trust level associated with the access device 114.

It is also possible for an administrator to alter the parameters that are important to maintain a secure session with a secure site. For example, the administrator can know that phishing attacks are increasing and therefore create a rule regarding the client device accessing certain websites that are known to be used in phishing attacks. The administrator for the secure site will identify the websites at issue so that the security agent 118 and/or authentication service 108 can understand that accessing these websites should be considered an adverse event when calculating the trust score. The security agent 118 and/or the authentication service 108 can create polling parameters for the secure service so that when a change is made to the criteria at the secure service, it notifies the security agent 118 and/or authentication service 108. Alternatively, the authentication service can regularly poll the secure service for changes at specific time-based intervals so that any updates are propagated throughout the system when an administrator makes changes to the information included in the trust calculation.

According to some examples, the method 500 includes determining that the trust level is below a threshold at step 530. For example, the browser plug-in, e.g., security agent 118 of FIG. 1 and/or the authentication service 108, can compare the calculated trust score to a threshold to determine if the access device 114 needs to reauthenticate the secure session prior to proceeding. There are numerous ways to implement a threshold. For example, the trust score could be 0-100, and the administrator can choose the level of trust required to continue the secure session. For some secure sites, the trust score could be 50 and not require reauthentication, and for other secure sites, any trust score under 90 could require reauthentication. The trust score need not be a range. For example, the threshold could be a series of requirements to maintain access. If the access device is at a secure location with the firewall active and an authentication device nearby, the threshold is met. If any one of the parameters listed is missing, then the threshold is not met, and remediation and reauthentication are required. The authentication service and/or security agent is able to alert the user about the deficiencies and provide guidance on how to mitigate the security failures that reduce the trust score below a threshold.

According to some examples, the method 500 includes updating the access permissions based on trust level and, based on the updated access permissions pausing the first session at step 540. For example, once the trust level is calculated, the system can respond to the calculated trust level by maintaining the status quo if the trust level is above the threshold or changing access permission based on the trust level being below the threshold. The browser plug-in, e.g., security agent 118 of FIG. 1, can receive the calculated trust level and, when it is below the threshold, change the access permissions for the access device. For example, the browser plug-in can change the access permissions such that the access device 114 is no longer allowed to access the secure session due to the trust score being too low. Once the access permission is changed, the browser plug-in can stop decrypting the access token when it is requested by the browser. Without the browser plug-in decrypting the access token, the encrypted access token is sent from the browser to the secure site. Because the encrypted access token is unreadable by the secure site, due to the encryption, it cannot authenticate the session with the browser and does not provide any further communications with the browser. When the plug-in stops decrypting the encrypted access token, the system effectively pauses or ends the secure session with the secure site. Through this mechanism, the system is able to provide an effective way to stop communications from the access device while its trust score is below an acceptable threshold. The system can provide guidance on how to improve the safety score, after which the authentication service or security agent can restore the access privileges.

According to some examples, the method 500 includes receiving mitigation data, wherein the mitigation data improves the trust level at step 550. For example, the plug-in, e.g., security agent 118 of FIG. 1, can provide information to the user that describes what aspects of the access device 114 are causing the trust score to fall below the threshold, causing the need for re-authentication. For example, if the firewall needs to be active to increase the trust score above the threshold, then that information can be communicated to the user so that the firewall can be reenabled. Another example can be that the user can be warned that a time period is expiring and reauthentication is needed or that the access device 114 needs to connect to an enterprise network to increase the trust score. Mitigation data involves steps that reduce the security concerns of the secure system, and allow for increased trust scores.

According to some examples, the method 500 includes updating the trust level based on the mitigation data at step 560. For example, after the plug-in, e.g., security agent 118 of FIG. 1, detects a change in security posture, the trust score can be recalculated to reflect the mitigation measures taken by the user at access device 114. After, for example, the firewall is reenabled, the security agent 118 and/or the authentication service 108 can recalculate the trust score reflecting the changing environment. Furthermore, this recalculation can take place after the access device 114 is connected to an enterprise network or after any other mitigation measures are taken.

According to some examples, the method 500 includes determining that the updated trust level is above the threshold at step 570. For example, after the security agent 118 and/or the authentication service 108 of FIG. 1 have recalculated the trust score, the updated trust score is compared to the threshold for access permissions. When the mitigation measures taken by the user with respect to the access device 114 increase the trust score over the threshold, the plug-in, e.g., security agent 118, will begin the process of decrypting the encrypted access token, which allows the browser, e.g., application 116, to begin accessing the secure session based on having a trust score above the threshold. However, if the mitigation measures increase the trust score but not over the threshold level, then the system will continue to pause the secure session and iterate the process mitigation and recalculation process until the trust score is increased above the threshold.

According to some examples, the method 500 includes resuming the first session based on the updated trust level at step 580. For example, after the plug-in, e.g., security agent 118, decrypts the encrypted access token, the browser is able to pass the access token from the browser to the secure site, e.g., resource 110, thereby confirming that the secure session between the access device 114 and resource 110 is authenticated.

Figure 6:
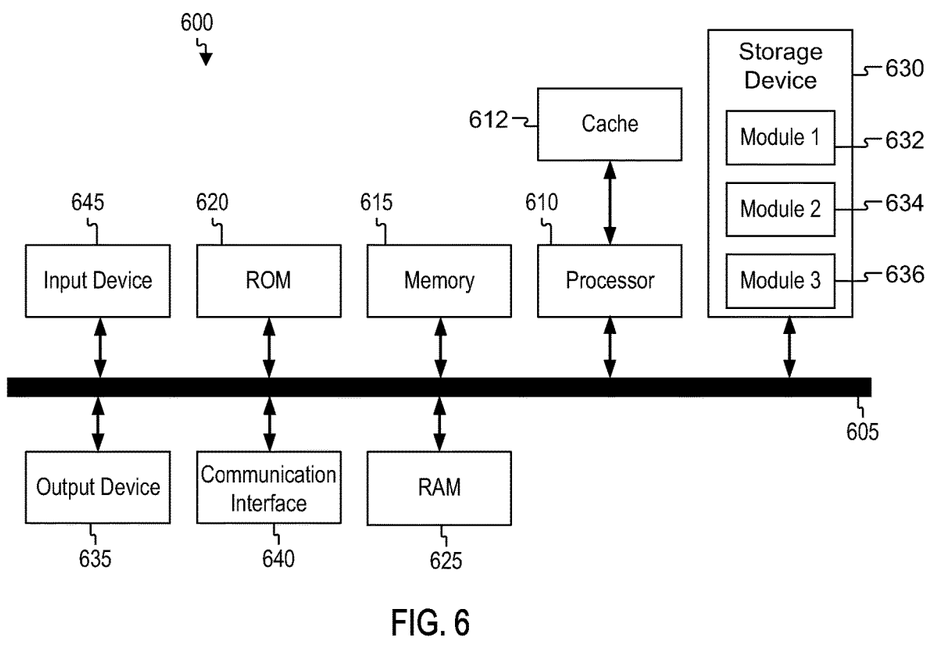
FIG. 6 shows an example of computing system 600, which can be, for example, any computing device that can implement components of the system described herein.

FIG. 6 shows an example of computing system 600, which can be, for example, any computing device making up the access device 114, the authentication device 104, authentication service 108, resource 110, or any component thereof in which the components of the system are in communication with each other using connection 605. Connection 605 can be a physical connection via a bus or a direct connection to processor 610, such as in a chipset architecture. Connection 605 can also be a virtual connection, networked connection, or logical connection.

In some embodiments, computing system 600 is a distributed system in which the functions described in this disclosure can be distributed within a data center, multiple data centers, a peer network, etc. In some embodiments, one or more of the described system components represents many such components, each performing some or all of the function for which the component is described. In some embodiments, the components can be physical or virtual devices.

The example system 600 includes at least one processing unit (CPU or processor) 610 and connection 605 that couples various system components, including system memory 615, such as read-only memory (ROM) 620 and random-access memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system containing multiple cores or processors, a bus, a memory controller, a cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, a keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., and when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special-purpose computer, or special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for client-based enforcement for mid-session reauthentication, the method comprising:
   intercepting, by a browser plug-in, an access token associated with a first service from a first communication, wherein a browser application running on a user access device uses the access token to initiate a first session with the first service on the user access device;
   encrypting, by the browser plug-in, the access token;
   inserting, by the browser plug-in, the encrypted access token into the first communication;
   storing, at the browser application, the encrypted access token in a memory location of the user access device;
   receiving a first signal associated with at least one of a user account and the first service, wherein the first signal includes information associated with access permissions; and
   calculating a trust level based on the first signal.

2. The method of claim 1, further comprising:
   intercepting, by the browser plug-in, a second communication associated with the first service from the browser application running on the user access device, the second communication including the encrypted access token; and
   decrypting, by the browser plug-in, the encrypted access token based on the access permissions associated the first service, wherein the decrypted access token is inserted back into the second communication before being sent by the browser application to the first service.

3. The method of claim 2, further comprising:
   sending the first communication by the browser application running on the user access device to the first service.

4. The method of claim 1, further comprising:
   determining that the trust level is below a threshold;
   updating the access permissions based on trust level; and
   based on the updated access permissions, pausing the first session.

5. The method of claim 4, further comprising:
   receiving mitigation data, wherein the mitigation data improves the trust level; and
   updating the trust level based on the mitigation data.

6. The method of claim 5, further comprising:
   determining that the updated trust level is above the threshold; and
   resuming the first session based on the updated trust level.

7. The method of claim 6, wherein resuming the first session includes decrypting the encrypted access token based on the updated trust level.

8. The method of claim 4, wherein access to the first service is restricted in the application running on the user access device until the trust level is above the trust threshold.

9. The method of claim 1, wherein the access token is associated with a user account and the access permissions of the first service.

10. A non-transitory computer-readable storage medium, the computer-readable storage medium including instructions that when executed by at least one processor, cause the at least one processor to:
    intercept, by a browser plug-in, an access token associated with a first service from a first communication, wherein a browser application running on a user access device uses the access token to initiate a first session with the first service on the user access device;
    encrypt, by the browser plug-in, the access token;
    insert, by the browser plug-in, the encrypted access token into the first communication;
    store, at the browser application, the encrypted access token in a memory location of the user access device;
    receive a first signal associated with at least one of a user account and the first service, wherein the first signal includes information associated with access permissions; and
    calculate a trust level based on the first signal.

11. The computer-readable storage medium of claim 10, wherein the instructions further configure the at least one processor to:
    intercept, by the browser plug-in, a second communication associated with the first service from the browser application running on the user access device, the second communication including the encrypted access token;
    decrypt, by the browser plug-in, the encrypted access token based on the access permissions associated with first service, wherein the decrypted access token is inserted back into the second communication before being sent by the browser application to the first service; and
    sending the first communication, by the browser application running on the user access device, to the first service.

12. The computer-readable storage medium of claim 10, wherein the instructions further configure the at least one processor to:
    determine that the trust level is below a threshold;
    update the access permissions based on trust level; and
    based on the updated access permissions, pausing the first session.

13. The computer-readable storage medium of claim 12, wherein the instructions further configure the at least one processor to:
    receive mitigation data, wherein the mitigation data improves the trust level;
    update the trust level based on the mitigation data;

determine that the updated trust level is above the threshold; and resume the first session based on the updated trust level.

14. A computing system of an authentication service comprising:
   a processor; and
   a memory storing instructions that, when executed by the processor, configure the system to:
      intercept, by a browser plug-in, an access token associated with a first service from a first communication, wherein a browser application running on a user access device uses the access token to initiate a first session with the first service on the user access device;
      encrypt, by the browser plug-in, the access token;
      insert, by the browser plug-in, the encrypted access token into the first communication;
      store, at the browser application, the encrypted access token in a memory location of the user access device;
      receive a first signal associated with at least one of a user account and the first service, wherein the first signal includes information associated with access permissions; and
      calculate a trust level based on the first signal.

15. The computing system of claim 14, wherein the instructions further configure the system to:
   intercept, by the browser plug-in, a second communication associated with the first service from the browser application running on the user access device, the second communication including the encrypted access token;
   decrypt, by the browser plug-in, the encrypted access token based on the access permissions associated with first service, wherein the decrypted access token is inserted back into the second communication before being sent by the browser application to the first service; and
   send the first communication, by the browser application running on the user access device, to the first service.

16. The computing system of claim 14, wherein the instructions further configure the system to:
   determine that the trust level is below a threshold;
   update the access permissions based on trust level; and
   based on the updated access permissions, pausing the first session.

17. The computing system of claim 16, wherein the instructions further configure the system to:
   receive mitigation data, wherein the mitigation data improves the trust level;
   update the trust level based on the mitigation data;
   determine that the updated trust level is above the threshold; and
   resume the first session based on the updated trust level.

18. The computing system of claim 17, wherein resuming the first session includes decrypting the encrypted access token based on the updated trust level.

19. The computing system of claim 16, wherein access to the first service is restricted in the application running on the user access device until the trust level is above the trust threshold.

20. The computing system of claim 14, wherein the access token is associated with a user account and the access permissions of the first service.

* * * * *